United States Patent [19]

Korthuis et al.

[11] Patent Number: 5,027,593
[45] Date of Patent: Jul. 2, 1991

[54] CROP BEATER METHOD AND APPARATUS

[75] Inventors: Scott Korthuis; Donald L. Korthuis, both of Lynden, Wash.

[73] Assignee: Korvan Industries, Inc., Lynden, Wash.

[21] Appl. No.: 455,276

[22] Filed: Dec. 22, 1989

[51] Int. Cl.$^5$ .............................. A01D 46/26
[52] U.S. Cl. .................... 56/328.1; 56/330
[58] Field of Search .......... 56/328.1, 330, 340.1, 56/128, 129

[56] References Cited

U.S. PATENT DOCUMENTS

| | | | |
|---|---|---|---|
| 2,447,122 | 8/1948 | Horst, Jr. | 56/330 |
| 3,184,908 | 8/1965 | Rust | 56/330 |
| 3,371,473 | 3/1968 | Burton | 56/330 |
| 3,494,117 | 2/1970 | Weygandt et al. | 56/330 |
| 3,596,457 | 8/1971 | Van Tine | 56/330 |
| 3,827,222 | 8/1974 | Toti | 56/330 |
| 3,968,631 | 7/1976 | Haiens | 56/328.1 |
| 3,987,608 | 10/1976 | Wilcox, Jr. | 56/328.1 |
| 4,077,193 | 3/1978 | Diggs | 56/328.1 |
| 4,177,891 | 12/1979 | Delfosse | 198/570 |
| 4,222,219 | 9/1980 | Lasswell | 56/328.1 |
| 4,292,792 | 10/1981 | Burton | 56/330 |
| 4,860,529 | 8/1989 | Peterson et al. | 56/330 |

FOREIGN PATENT DOCUMENTS

2361885  6/1975  Fed. Rep. of Germany ........ 56/330

*Primary Examiner*—William P. Neuder
*Attorney, Agent, or Firm*—Hughes & Multer

[57] ABSTRACT

An apparatus for harvesting produce from row crops, a pair of beater rods for use in said apparatus, and methods related to the apparatus, wherein the apparatus comprises a chassis which travels along the row of crops, and a harvesting unit, which is carried by the chassis and which comprises: A means for engaging and depressing an upper side and a means for engaging and raising a lower side of various portions of the crops, with the side engaging means defining a crop receiving area therebetween and with the crop portions entering into the crop receiving area and being raised and depressed; a means operatively connected to the side engaging means for imparting first and second vertical components of oscillation to the depressing and raising of the crop portions; with the apparatus being characterized in that a central zone of the second component (said second component comprising a lower zone, said central zone, and an upper zone) is oscillated up and down about a fixed horizontal axis. The side engaging means comprises a pair of beater rods, which have upper and lower portions each and which comprise an upper rod and a lower rod which receive the crops therebetween, with the pair of rods performing a rotational-lateral motion into and out of the plant as the harvesting unit moves forwardly along the crop row, so that the pair imparts a primary up and down motion to the crop while the entire harvesting unit is shaken up and down with the secondary oscillating motion.

24 Claims, 6 Drawing Sheets

CROP BEATER METHOD AND APPARATUS

BACKGROUND OF THE INVENTION

1. Field of the Invention

The present invention relates generally to methods and apparatus used in harvesters to dislodge produce from upstanding plants, and more particularly to oscillating beaters used in the harvesters.

2. Background Art

There are harvesters, such as shown in U.S. Pat. No. 3,184,908 (Rust), [FIG. 2], which have harvesting units comprising a vertical hub mounted for free rotation about a vertical axis and a plurality of beater rods attached to the hub and extending radially outwardly therefrom. The harvester typically moves along a row of upstanding plants so that the beater rods engage the plants so as to strike or vibrate the plants, thereby dislodging the produce from the plant for collection. Because the hub is free wheeling, the rods, in effect, walk through the plant as the harvesting unit moves along the row. In the Rust device, the beater rods oscillate simply up and down.

With harvesting, an underlying problem is that harvesting desirably is done quickly and this involves vigorous shaking or acceleration of the beater rods. However, the acceleration which is used to shake the produce from the plants must not be excessive so as to injure the plants and the produce. Furthermore, in order to maximize the harvesting yield, an important consideration is being sure to reach all the portions of the plants which contain ripe produce, i.e., to cover the entire vertical length of the plant with the beaters.

As the Rust device illustrates, when the beater rods are oscillated in an up and down motion which is substantially harmonic motion the rods oscillate about an equilibrium position in an oscillation region (which extends from one amplitude above the equilibrium position to one amplitude below the equilibrium position). While this oscillation region may cover an entire vertical spacing distance, which is a vertical distance between the rods, thereby seeming to cover the entire vertical length of the plant, the action of the rods is uneven. In as much as the up and down motion approximates simple harmonic motion, which is characterized by maximum velocity of the rods as they cross the equilibrium position and minimum velocity of the rods at the outer edges of the oscillation region, the rods impart a relatively high velocity to branches which are contacted near the equilibrium position and a relatively low velocity to branches which are contacted by the rods near the edges of the oscillation region. This leads to uneven harvesting and uneven coverage of the plant.

Furthermore, in the case of the Rust device, so that in moving up and down the rods are able to traverse the entire vertical length of the plant, the oscillation of the beater rods must necessarily have a relatively large amplitude. In order to avoid giving the rods too high an acceleration which may damage the plants, with the acceleration of the rods being a function of both a frequency and the amplitude of the motion, the frequency must be reduced to compensate for the large amplitude. Accordingly, the amplitude imposes a limit on how high the frequency may be, and vice versa. Sometimes this results in slower harvesting.

In some settings, an external wire may be used. U.S. Pat. No. 3,371,473 (Burton) shows a horizontal tensioned wire 10, upon which are supported the plants to be harvested and which moves up and down with the plants. A shaking mechanism, which is a hub mounted for free rotation about a tilted axis x—x and which has a single tier of evenly spaced radially projecting arms, engages and shakes the wire 10 and the plants. The arms are shaken back and forth along another tilted axis y—y, so that as the mechanism moves along the wire, the arms walk through the plants and the hub rotates with the arms, thereby enabling the arms to engage the wire 10 from underneath. Each arm is made of a slightly longitudinally undulating shape which provides a longitudinally extending recess 25 along the center of the arm. The effectiveness of each arm depends upon the time that the arm is able to maintain operative contact with the underside of the wire 10. The undulating shape of the arm is directed at restraining the movement of the wire 10 and drawing the wire 10 toward the axis of the hub. (An outwardly and upwardly turned horn 28 at the end of the arm also helps to engage and draw the wire 10 toward the hub.)

In many harvesting applications such wires are not visible. This may be for a number of reasons including the labor costs of stringing and tying the wire. Thus, often the beater rods must shake the plants directly.

Rather than using an up and down motion, there are harvesters which impart an orbital motion of one kind or another to the beater rods. For example, U.S. Pat. No. 3,494,117 (Weygandt et al) shows a drum or a head 13 which, in all embodiments of the patent, is mounted for free rotation about a vertical axis and which has a plurality of vertically spaced and radially projecting tines 16 attached thereto. Within the head 13 are various arrangements of counterweights which swing in various ways on levers to impart a desired movement to the tines. In a first embodiment (FIGS. 2 and 3), the counterweights cause the head 13 to orbit about an axis which is transverse to the path of the harvesting machine, i.e., orbit about the transverse axis within a vertical plane. Consequently, the tines 16 that at any time are disposed transversely of the vehicle and that engage the plant, (the "active tines") orbit in a plane normal to the length of the active tines 16. The motion of the beater rod is circular, rather than up and down as in the earlier described prior art. The motion approximates uniform circular motion, which has a constant linear velocity. However, when a vertical component of the circular motion is considered, and in many settings this vertical component is the important component for purposes of shaking the branches, the vertical component again has its maximum velocity when it crosses a central location, i.e., the equilibrium position, and has its minimum velocity at the extreme upper and lower edges of its region of oscillation. In other words, while the rod is moving with constant linear velocity in a circle, a branch which contacts the rod at the extreme upper and lower edges of the circle may merely graze the rod, and a branch which contacts the rod near the central zone of the circle will be accelerated sharply at right angles to the length of the branch. The latter branch receives a much stronger shake than the former branch. Thus the orbital motion may in many settings provide an uneven shaking to the bush.

In a second embodiment (FIGS. 4 and 5), the counterweights act to cause a torsional oscillation of the head 13a, which is combined with a vertical up and down shaking, so as to cause all of the tines 16a on the head 13a to move in cylindrical paths about a stationary lengthwise axis of the tines 16a. The cylindrical paths of the second embodiment are like the cylindrical paths of the first embodiment. In other words, under certain conditions, the tines 16a will unevenly cover the plant. Again, the frequency and amplitude of the orbital motion may have to be carefully balanced in order to avoid injuring the plant. Again, to obtain the desired full vertical coverage of the plant, the amplitude of the orbit must be relatively large and therefore the frequency must be correspondingly reduced. In a third embodiment (FIGS. 6 and 7) the counterweights act to make the head 13b, which is again vertically disposed, to oscillate through a simple arc, back and forth about an axis 121 which is vertical and which is external to the head 13b. Thus, the tines 16b, in effect, wiggle horizontally as the head 13b rotates in a freely rotating fashion through the plants.

Another device which imparts an orbital motion is shown in U.S. Pat. No. 4,292,792 (Burton). The patent shows a vertical shaft 25 (FIG. 7) which supports a plurality of vertically spaced, radially projecting beater rods and which is mounted for free rotation on a smaller, concentric shaft 81. As the beater rods extend radially the beater rods are tilted. The assembly, including the rods, the shaft 25, and the shaft 81, moves atout another vertical shaft means 63 (a lower part of which is numbered 64), thereby moving, as is shown in the top view of FIG. 8, in a circular, horizontal orbit 68. Accordingly, the beater assembly orbits horizontally into and out of the plants, with the beater rods being held in the tilted orientation.

While the prior art harvesters approach the problem of covering the plants evenly, and offer various forms of orbital motion of the beater rods to do this, the prior art still has not found a satisfactory way to bring the entire plant into contact with the rods with the rods moving at a velocity which is neither too high or too low. Additionally, a means is needed to improve the contact between the beater rods and the branches so that the rods contact the branches at more locations.

A search of U.S. Patent literature, in addition to disclosing the four patents mentioned, shows the following patents:

U.S. Pat. No. 4,222,219 (Lasswell) shows a fruit picking machine with looped spindles that rotate about a horizontal axis projecting horizontally into the fruit tree.

U.S. Pat. No. 3,987,608 (Wilcox Jr.) shows in FIG. 2 downwardly concave horizontal fruit picking fingers for grasping fruit from trees.

U.S. Pat. No. 3,968,631 (Haines) shows curved fruit picking fingers which come into contact with the fruit.

U.S. Pat. No. 3,827,222 (Toti) shows picking arms which individually rotate about a horizontal axis, which include an offset nose portion which moves eccentrically relative to the axis of the arm.

U.S. Pat. No. 3,596,457 (Van Tine) shows a shaft, with spoked rods arranged in spaced tiers emanating from the shaft, rotating about a longitudinal axis and reciprocating back and forth on its support.

SUMMARY OF THE INVENTION

The present invention includes an apparatus for harvesting produce from a row of crops, said apparatus comprising a chassis, which is adapted to travel along the row, and a harvesting unit which is carried by the chassis. The harvesting unit has a means for engaging and depressing an upper side and engaging and raising a lower side of various portions of the crops, with the upper side engaging means and the lower side engaging means defining a crop receiving area in which the crop portions are received, whereby the depressing and raising oscillates the crop portions. The harvesting unit also has means operatively connected to the depressing and raising means for giving to the depressing and raising first and second vertical components of oscillation. The apparatus is characterized in that a central zone of the second component of oscillation (with the second component of oscillation comprising a lower zone, the central zone, and an upper zone) is oscillated up and down about a fixed horizontal axis.

The present invention also includes an apparatus comprising the chassis, a vertically aligned hub means, which is carried by the chassis and which is positioned to be adjacent to the row of crops as the chassis travels along the row, a beater rod assembly attached to the hub means, and a secondary oscillating means operatively connected to the beater rod assembly to move the assembly upwardly and downwardly.

The beater rod assembly comprises a plurality of beater rods which are attached to the hub means at vertically spaced locations and which extend radially outwardly from the hub means. Each of the beater rod means has a lengthwise axis and at least an upwardly slanted portion which slants radially outwardly and upwardly and a downwardly slanted portion which is spaced from the upwardly slanted portion along the lengthwise axis and which slants radially outwardly and downwardly to form upper and lower portions of the beater rod means. Each of the beater rod means is rotatably mounted about a respective vertical axis in a manner that as the chassis moves along the row, each of the beater rods means moves on a rotational path having a first path portion where each of the rod means rotates from a forwardly extending position rearwardly and laterally into the row to a laterally extending position, and a second path portion where the rod means rotates from the laterally extending position further rearwardly to a rearwardly extending position. The upper and lower portions of the rod means have lateral components of motion into and out of the row of plants as the rods means moves on the rotational path, so that various crop portions of the plants are raised and depressed as each of the crop portions are engaged successively by the upper and lower portions of the rod means.

The secondary oscillating means imparts secondary up and down components of movement to each of the crop portions as the crop portions are raised and depressed. The apparatus is characterized in that a pair of upper and lower related rod means is in vertical alignment. In other words, the upper and lower portions, respectively, of the upper rod means are vertically aligned with the upper and lower portions, respectively, of the lower rod means, so that the upper and lower rod means cooperate in the raising and depressing of the crop portions.

The beater rod means has at least one of the upper portions and one of the lower portions which is spaced along the lengthwise axis from the upper portion, with the upper portion comprising one of the upwardly slanted portions and one of the downwardly slanted portions. The lower portion comprises one of the downwardly slanted portions and one of the upwardly slanted portions. A structural depth of the beater rod means, which is a vertical distance from an upper side of the upper portion of the beater rod means to a lower side of the lower portion, is greater than three times an amplitude of the secondary up and down components of movement which are imparted by the secondary oscillating means. A sum of the structural depth plus twice the amplitude of the secondary up and down components of motion equals at least a vertical spacing distance by which the beater rod means are vertically spaced from one another in the rod assembly. The beater rod means ends outwardly with one of the downwardly slanted portions. The upper portions and the lower portions of the beater rods are spaced along the lengthwise axis of the beater rod means by an axial distance which is 0.5 to 5 times a travel distance which said chassis travels in one second.

The upper and lower beater rod means, respectively, which are in vertical alignment may be in, respectively, an upper tier of said beater rod means and a vertically adjacent lower tier of the beater rod means. Alternatively, the upper and lower rod means, respectively, which are in vertical alignment, may be in, respectively, an upper tier of the beater rod means and a lower tier of the beater rod means with said upper and lower tiers being separated by a middle tier of the beater rod means and with the beater rod means of the middle tier being angularly displaced from vertical alignment positions of vertical alignment with the beater rod means of the upper and lower tiers by an angular displacement which is half of an angular displacement between the beater rod means of the upper and lower tiers.

The present invention also includes a pair of the beater rod means for use in the apparatus for harvesting produce from a row of crops. The pair of beater rod means comprises the upper beater rod means and the lower beater rod means, with each of the beater rod means having the lengthwise axis and at least the upwardly slanted portion and the downwardly slanted portion which is spaced from the upwardly slanted portion along the axis, to form the upper and lower portions of the beater rod means. The beater rod means are adapted to be mounted at vertically spaced locations upon the substantially vertically aligned hub means which is carried by the chassis. Also, the beater rod means are adapted to extend radially outwardly from the hub means and to be in vertical alignment with one another.

The present invention also includes a method for harvesting produce from upstanding plants comprising engaging the side engaging means with the upper side and the lower side of the various portions of the crops; and imparting to the upper and lower sides of the crop portions the first and second vertical components of oscillation. The method is characterized in that the central zone of the second component of oscillation is oscillated up and down about the neutral position.

The invention also includes a method for harvesting produce from upstanding plants comprising providing the harvesting unit; moving the harvesting unit along the row of the plants in the manner that each of the rod means moves on the rotational path having the first path portion and the second path portion; and moving the rod assembly up and down to impart the secondary up and down components of movement to each of the crop portions as the crop portions are raised and lowered. The method is characterized in that the set of the upper and lower related rod means are in the vertical alignment. The method is further characterized in that the upper and lower rod means define the crop receiving area which is adapted to receive the crop portions in the manner that as the upper and lower rod means move laterally into and out of the row during the rotational-lateral movement of the rod means, the crop portions ride upwardly upon the downwardly slanted portion of the lower rod means whereby the crop portions are raised, and the crop portions ride downwardly upon the upwardly slanted portions of the upper rod means, whereby the crop portions are depressed.

The beater rod means spring load the crop portions, with the spring loading having vertical spring loading components which spring load the crop portion upwardly and downwardly during the upward and downward movement of the beater rod means.

An amplitude of the raising and depressing of the crop portions (discounting the secondary up and down components of motion of the rod assembly), is 0.5 to 4 times an amplitude of the secondary up and down components of motion of the rod assembly. A frequency of the secondary up and down components of motion of the rod assembly is 20 to 80 times a frequency of the raising and depressing of the crop portions discounting the secondary up and down components of motions of the rod assembly. The combination of the upwardly slanted portion and the downwardly slanted portion of the beater rod means facilitates touching of the beater rod means with individual branches of the plants at multiple locations on the branches.

BRIEF DESCRIPTION OF THE DRAWINGS

FIGS. 2.1 through 2.6 (collectively "FIG. 2") are sequential top views illustrating progressive positions of a hub and of a pair of vertically aligned beater rods which are attached to the hub, as the harvesting unit moves along a line which is parallel to a row of plants and as the pair of rods moves laterally into and out of a plant in the row;

FIGS. 5.1 through 5.6 sequential side views of the crop portion which is in a crop receiving area between the vertically aligned pair of wavy-shaped beater rods so as to illustrate the interaction of the pair of beater rods the crop portion;

DESCRIPTION OF THE PREFERRED EMBODIMENT

Figure 1:
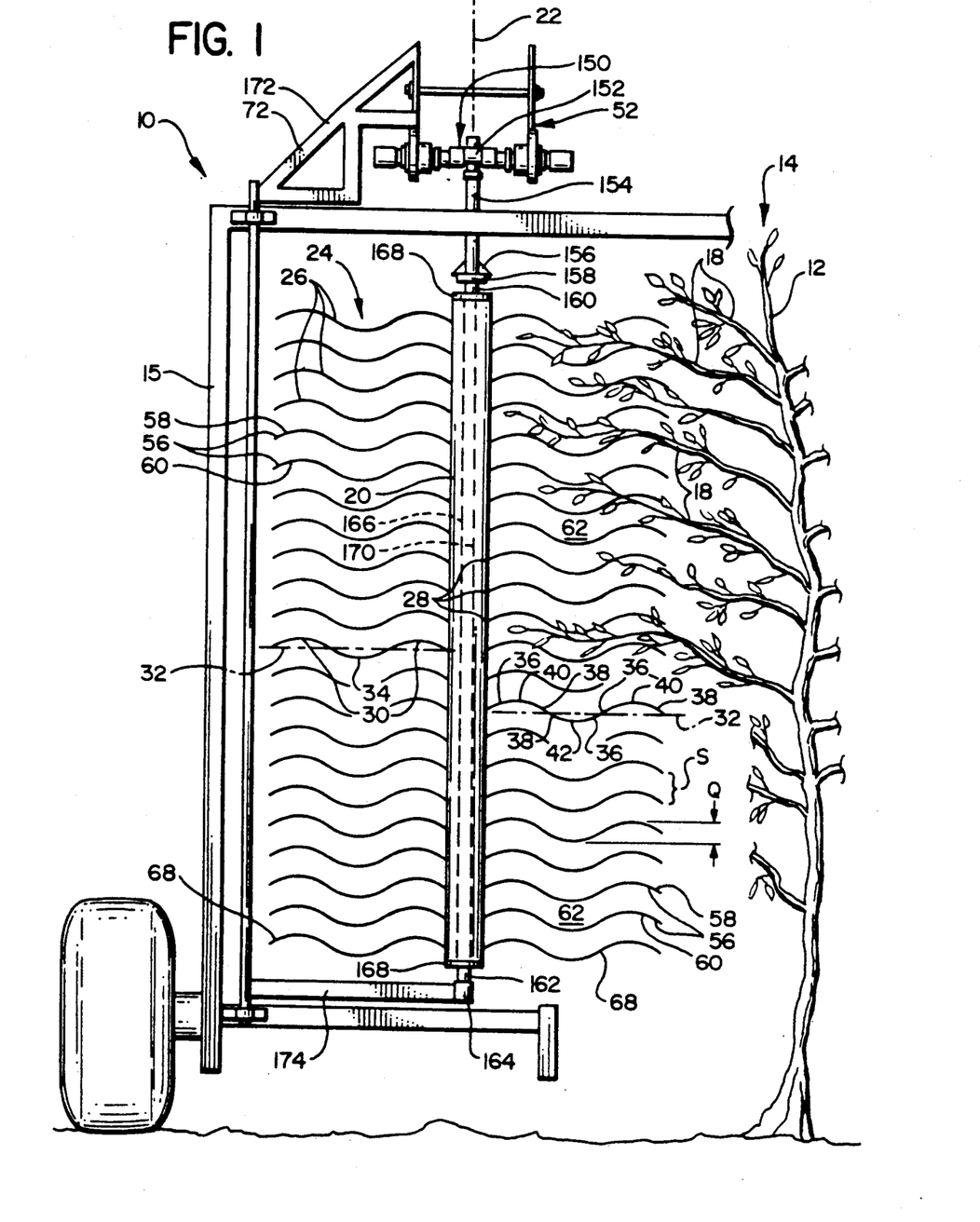
FIG. 1 is an elevational view from the rear of a chassis supporting a harvesting unit of the present invention which comprises beater rods which have a wavy shape.
Figure 8:
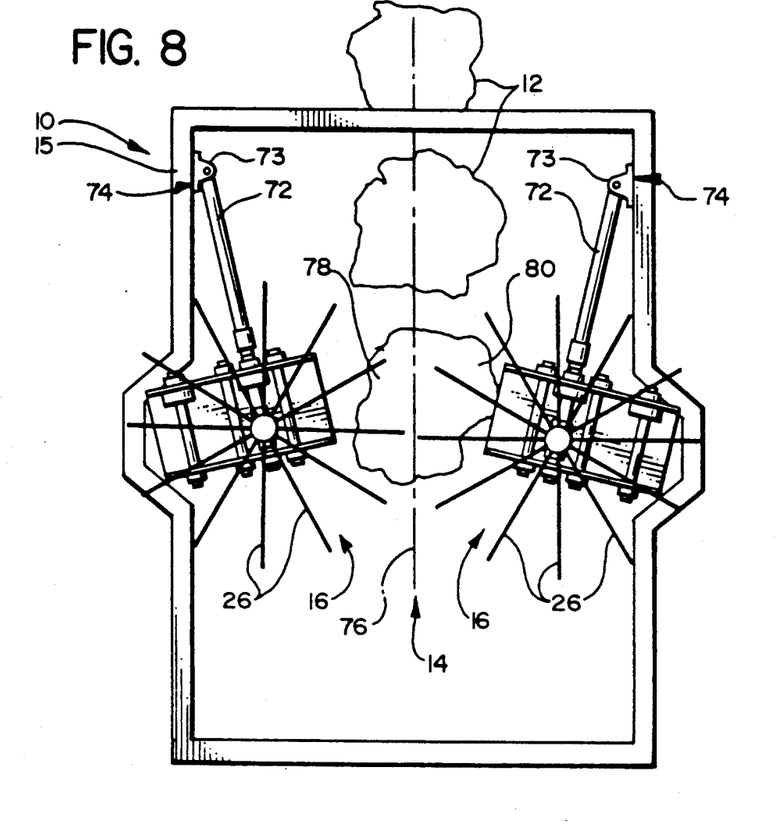
FIG. 8 is a top view of a chassis comprising two of the harvesting units of the present invention with the row of plants entering from the top of the figure into a crop harvesting area in the harvester.

FIG. 1 shows a harvesting machine 10 for harvesting produce from individual plants 12, such as coffee plants or berry bushes, which are arranged in a row 14. (FIG. 8 shows row 14 best). The machine 10 comprises a chassis or frame 15 and a harvesting unit 16 which is adapted to be positioned adjacent to the row 14 as the machine 10 travels along the row 14 and which incorporates the present invention. The harvesting unit 16 oscillates vertically so as to beat or shake the plants 12 including their outgrowing branches 18, whereby the produce from the plants 12 is dislodged and collected.

As shown in FIG. 1, the harvesting unit 16 comprises a vertically aligned hub or post 20 which is freely rotatable about a vertical axis 22 and a rod assembly 24 that includes a plurality of crop beater elements or rods 26 which are attached to the post 20 at vertically spaced locations designated 28 and which extend radially outwardly from the post 20.

The terms "radially outward" or "radially outwardly" will denote a direction away from, or a condition of being far from, the post 20, while the terms "radially inward" or "radially inwardly" will denote the opposite. The terms "forward" and "forwardly" will denote the direction in which the machine 10 moves along the row 14, while the terms "rearward" and "rearwardly" will denote the opposite.

As shown in FIG. 1, each rod has at least one upper portion 30 which bulges or curves upwardly above a lengthwise axis 32 of the rod 26 and a downwardly curving lower portion 34 which is spaced from the upper portion along the axis 32. The upper portion 30 comprises an upwardly slanting part 36, which slants radially outwardly and upwardly, and a downwardly slanting part 38 which slants radially outwardly and downwardly. In forming the upper portion 30, the downwardly slanting part 38 joins to the upwardly slanting part 36 at an upper junction 40 and is spaced radially outwardly from the upwardly slanting part 36 along the lengthwise axis 32 of the rod 26. Similarly, the lower portion 34 comprises the downwardly slanting part 38 and the upwardly slanting part 36. In this case, the upwardly slanting part 36 joins to the downwardly slanting part 38 at a lower junction 42 and is spaced radially outwardly from the downwardly slanting part 33 along the lengthwise axis of the rod 26.

As shown in successive top views of a vertically aligned pair of rods 26 attached to the post 20 of FIGS. 2.1 through 2.6, when the harvesting unit 16 moves along a line 43 which is parallel to the line of the row 14, each beater rod 26, which is rotatable about the vertical axis 22 which is at one end of the rods 26, is rotated by the relative shearing motion of the forwardly moving unit 16 and the stationary plant 12. Thus, each rod 26 in effect is walked forwardly through the plants 12 during which motion each rod 26 also moves laterally in toward the plant's center 44 and then laterally out from the plant. From the plant's frame of reference, each rod 26 slips into the plant and out again. As shown in FIG. 5, during this thrusting of the rods 26 into the plant along the rods' lengthwise axes 32 and during the withdrawing of the rods 26 from the plant, the upper portion 30 and the lower portion 34 of each rod successively engage various crop portions 46 of the plant 12. The crop portions 46 are raised and depressed by this lateral inward and outward motion of the upper portions 30 and the lower portions 34.

Figure 4:
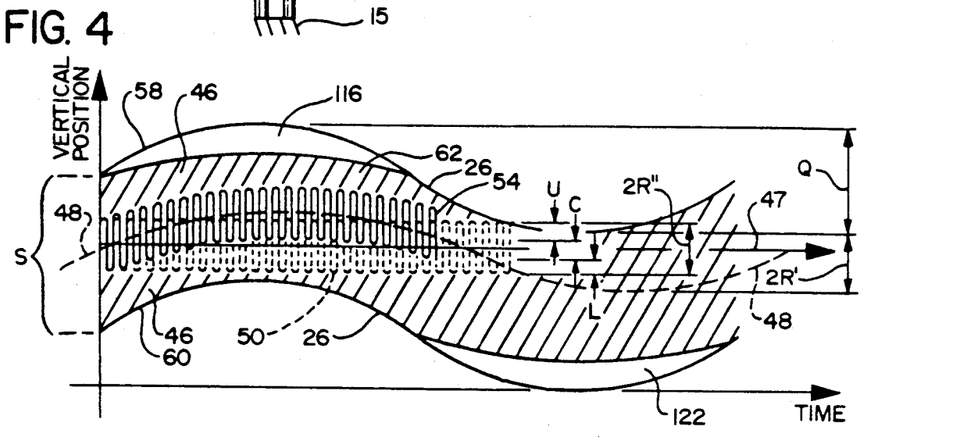
FIG. 4 is a vertical position versus time graph illustrating positions of a crop portion (which is between a pair of the vertically aligned wavy-shaped beater rods, and of the wavy-shaped beater rods, and also showing certain dynamic and dimensional relationships.

FIG. 4 is a graph showing the position of a crop portion 46 (which is indicated by the diagonally crosshatched area 46) relative to a neutral fixed horizontal axis 47 as the crop portion 46 is raised and depressed over time. Combined with the raising and depressing which may be considered a primary oscillation (shown by a curved dotted line 48 in FIG. 4) of the crop portion 46, is a secondary oscillation (shown by a rapidly oscillating dotted curve 50 in the FIG. 4). The secondary oscillation is created by a mechanical secondary up and down shaking means 52 (shown in FIG. 1), which shakes the entire harvesting unit 16 rapidly up and down as for example 200-1200 rpm. The rotational motion of the rods 26 about the axis 22, which is matched to the ground speed of the machine 10, and the resulting primary oscillation are relatively slow, while the secondary oscillation is relatively fast. The primary oscillation and the secondary oscillation are superposed to form a combined primary and secondary motion which is illustrated by the rapidly oscillating solid curve 54.

The secondary oscillation (considered alone, without the primary oscillation) may be considered as having three zones, a lower zone L, a central zone C, and an upper zone U. Together the zones L, C and U constitute a region LCU. A velocity of the secondary oscillation (considered alone) is maximum when the secondary oscillation motion crosses the fixed horizontal axis 47 in the central zone C. The velocity is lowest when the oscillation motion is at the extreme upper and lower edges of the oscillating region LCU, that is, at the outer edges of the zones L and U. By virtue of the superposition of the primary oscillation upon the secondary oscillation, the higher velocity zone C of the secondary oscillation is moved upwardly and downwardly about the fixed horizontal axis 47.

Hence, the central zone C with its higher velocities penetrates more deeply into the plant. It is theorized that this provides a more even distribution of the velocities of the shaking rods 26 throughout the plant, and that this is a reason why the present invention provides a more effective shaking action. Furthermore, as will be discussed below in connection with the details concerning the interaction of the pairs of the rods with the crop portions 46, the crop portions 46 in effect are spring loaded against upper and lower rods 26 as the crop portions 46 are first uplifted by the upper portion 30 a lower rod and then depressed by the lower portion 34 of an upper rod, while the secondary oscillation is also imparted to crop portions 46.

Figure 3:
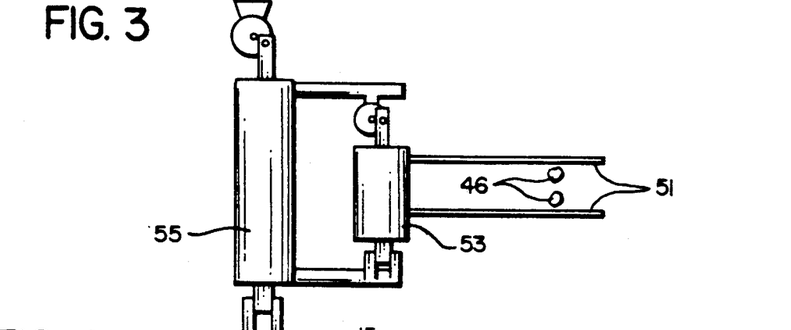
FIG. 3 is a schematic side view which illustrates a pair of straight beater rods which in accordance with the principles of the present invention are vibrated up and down both by a secondary oscillating means and by a primary oscillating means.

To illustrate the compound motion in another manner, FIG. 3 schematically presents a means of generating the compound motion. A pair 51 of vertically spaced and vertically aligned straight beater rods is shown mounted upon a secondary oscillating means 53 which imparts the secondary oscillation to the pair 51 of rods, while the secondary oscillating means 53 is mounted upon a primary oscillating means 55, which in turn is mounted upon the chassis 15 and which imparts the primary oscillation to the secondary oscillating means 53 and to the pair 51 of rods. Consequently, the beater rods 51 which engage the crop portion 46 impart the superposed primary and secondary oscillations to the crop portion 46. In practice, the mechanical secondary up and down shaking means 52 of FIG. 1 is the secondary oscillation means 53 of FIG. 3, while the configuration of the vertically aligned pairs of the rods 26 of FIG. 1 with their upper portions 30 and lower portions 34, and the positioning of the hub 20 and the rods 26 causing the rods 26 to perform their rotational-lateral motion, provide the primary oscillation as symbolized by the primary oscillating means 55 of FIG. 3.

As shown in FIG. 1, the rods 26 are arranged in the pairs which are designated 56, with each pair 56 comprising an upper rod 58 and a lower rod 60 and with the two rods 58 and 60 being vertically aligned with one another. (Every rod 26 in the rod assembly 24, except lowest rods 68 may be considered as an upper rod 58 belonging to a pair 56 of rods. That is, every rod 26, excepting the lowest rods 68, may be paired with a next lower rod 26, to constitute a pair 56 of rods.) The two rods 58 and 60 define therebetween a crop receiving area 62 which, as shown in FIG. 5, receives the crop portions 46 in a manner that, as the rods perform their lateral in and out motion relative to the plant 12, the crop portions 46 move from an outer region 64 (FIG. 5.1) of the crop receiving area 62 to an inner region 66 (FIG. 5.4) thereof and back out again. Accordingly, crop portions 46 are raised by the upper portion 30 of the lower rod 60 and are depressed by the lower portion 34 of the upper rod 58 (in the manner to be described in greater detail below.) Thus, the desired raising and depressing and spring loading of the crop portions 46 is accomplished by the cooperative action of the upper rod 58 and the lower rod 60.

It is believed that it would be helpful row to describe some dimensional relationships of the present invention which enable the rods 26 to cover the entire vertical length of the plant 12 as the rods 26 shake the plant 12. FIG. 4 as mentioned plots the positions over time of the crop portion 46 which is located in the crop receiving area 62, and FIG. 4 also graphs the positions of the upper rod 58 and the lower rod 60 of the pair 56 of rods relative to the horizontal fixed axis 47. As FIG. 4 (and FIG. 1) show, the upper rod 58 and the lower rod 60 are vertically spaced by a spacing distance S. Thus, each rod 26 is responsible for covering an entire vertical distance S of the plant 12. As shown in FIG. 4, in the present invention this coverage is accomplished by having a sum of a structural depth Q of each of the rods 26 and a vertical coverage component 2R" of the secondary oscillation equal or exceed the vertical spacing distance S between the rods 26. The structural depth Q of the rods 26, which, as shown in FIG. 1 is a vertical distance between a top of the upper portion 30 and the bottom of the lower portion 34 for each rod 26, is provided by the succession of the upwardly slanting parts 36 and the downwardly slanting parts 38 to form the shape of the rods 26. This sum of Q and 2R" is illustrated in FIG. 4 by the sum of the lengths of the arrows Q and 2R" equaling the distance S. The vertical coverage component 2R" represents the total vertical displacement of each rod 26 as the rod 26 moves up and down under the influence of the secondary oscillation, between the rod's 26 maximum upward location and maximum downward location.

As an additional feature of the present invention, the shape of the rods also provides more locations at which the rods 26 may directly touch the branches 18 of the plants 12 thereby improving contact between the rods 26 and the plant 12. Additionally, the use of one of the downwardly slanting parts 38 in the configuration of the rod 26 at the outer most end of the rod 26 helps to reduce snagging and tearing of some of the branches 18 that may become tangled.

Figure 6:
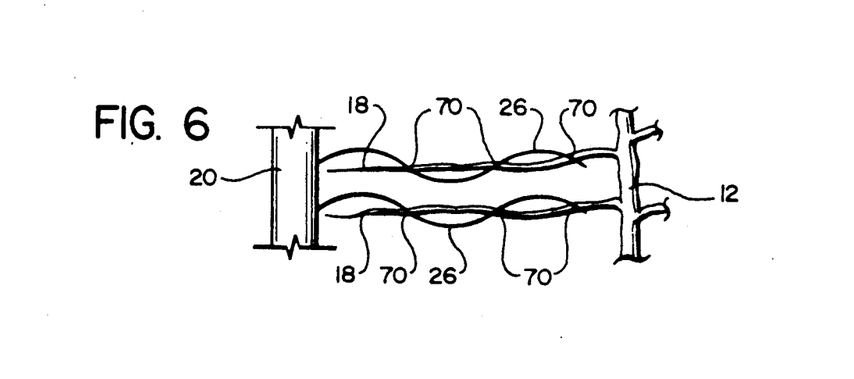
FIG. 6 is an enlarged side view of a pair of the wavy-shaped beater rods illustrating a plurality of contact points between the beater rods and the branches of the plants.

Let us turn now to a further detailed description of the apparatus. As mentioned above, the rod assembly 24 comprises rods 26 attached to the post 20 at vertically spaced locations 28, which are spaced from one another by the vertical distance S, and also as mentioned the shape and arrangement of the rods 26 serves multiple functions. For creating the upward and downward pushing surfaces of the rods 26, giving the rods 26 the structural depth Q, and enabling the rods 26 to contact the branches 18 at multiple locations, as shown in FIG. 1 each rod 26 has at least one of the first upwardly slanting parts 36 joined with at least one of the downwardly slanting parts 38. Preferably, as shown in FIG. 1, a plurality of the first upwardly slanting parts 36 and of the downwardly slanted parts 38, which are combined to form the upper portion 30 and the lower portion 34, are linked along the lengthwise axis 32. In practice it has been found most practical, starting with an inward and of the rod 26 and moving radially outwardly, to link one of the upper portions 30, one of the lower portions 34, and one of the upper portions 30 again, in succession along the lengthwise axis 32. When this configuration is used, the outward end of each rod 26 will have one of the downwardly slanting parts 38. As illustrated in FIG. 6, the linked parts 36 and 38 enable each rod 26 to touch the branches at several touching locations designated 70. As shown in FIG. 1, to form the crop receiving area 62 for successively raising and depressing the crop portion 46, each of the two rods 58 and 60 moving successively radially outwardly has the mentioned successive configuration that comprises the upper portion 30 followed by the lower portion 34 and the upper portion 30, these successions of the portions 30 and 34 of the upper and lower rods 58 and 60 being respectively aligned vertically.

Figure 7:
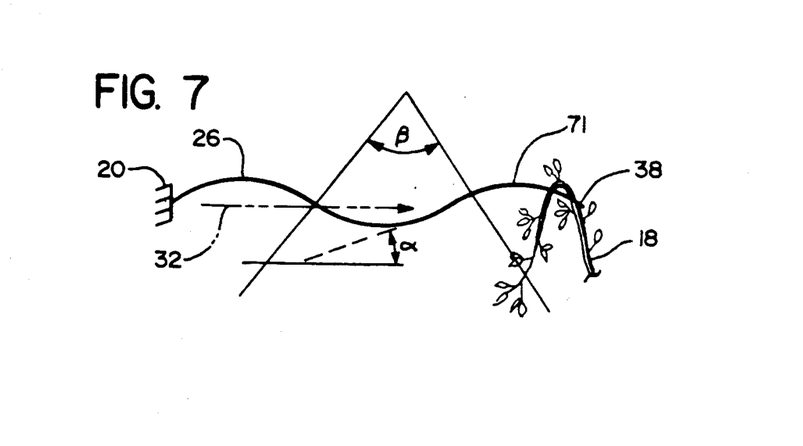
FIG. 7 is a side view further enlarged portion of one of the wavy-shaped beater rods.

As shown in FIG. 7, to avoid snagging or hooking of tensioned branches 18 for certain kinds of plants, the mentioned positioning of the downwardly slanting part 38 at the outward end of each rod 26 will be helpful in practice. This positioning of the slanted part 38 helps to form a hump 71 which it is believed, helps to keep branches 18 that are under tension from working their way too far inwardly on the rod 26 where they would become hooked or snagged and where the stress would injure them.

Continuing with the detailed description of the harvesting unit 16, the harvesting machine 10 typically straddles the row 14 and allows the row 14 to pass through a central enclosure in the machine 10 as the machine 10 moves forwardly along the row 14. To enable the harvester to adapt to different widths of the plants 12 relative to the central enclosure, as shown in the view from the rear of FIG. 1 and the top view of FIG. 8 a pair of right and left harvesting units 16 are each mounted on a related one of right and left swinging frames 72 which, by coil springs or other resilient means at 73, press the right and left harvesting units 16 against the sides of the row 14 of plants 12. To provide a gradual lateral adjustment to the varying width of the plants 12, each swinging frame 72 extends from its pivotal mounting location 74 rearwardly and toward the row 14, preferably at a gradual angle. Preferably the left and right harvesting unit 16 are directly across a longitudinal axis 76 from one another. This enables the plants 12 to be shaken at a left side 78 and at a right side 80 simultaneously, with this simultaneous shaking enhancing the harvesting action. The rods of the left harvesting unit 16 may be slightly higher from the ground than the rods of the right harvesting unit 16 so as to avoid having the rods 26 of the two harvesting units collide at the center of the machine.

Figure 13:
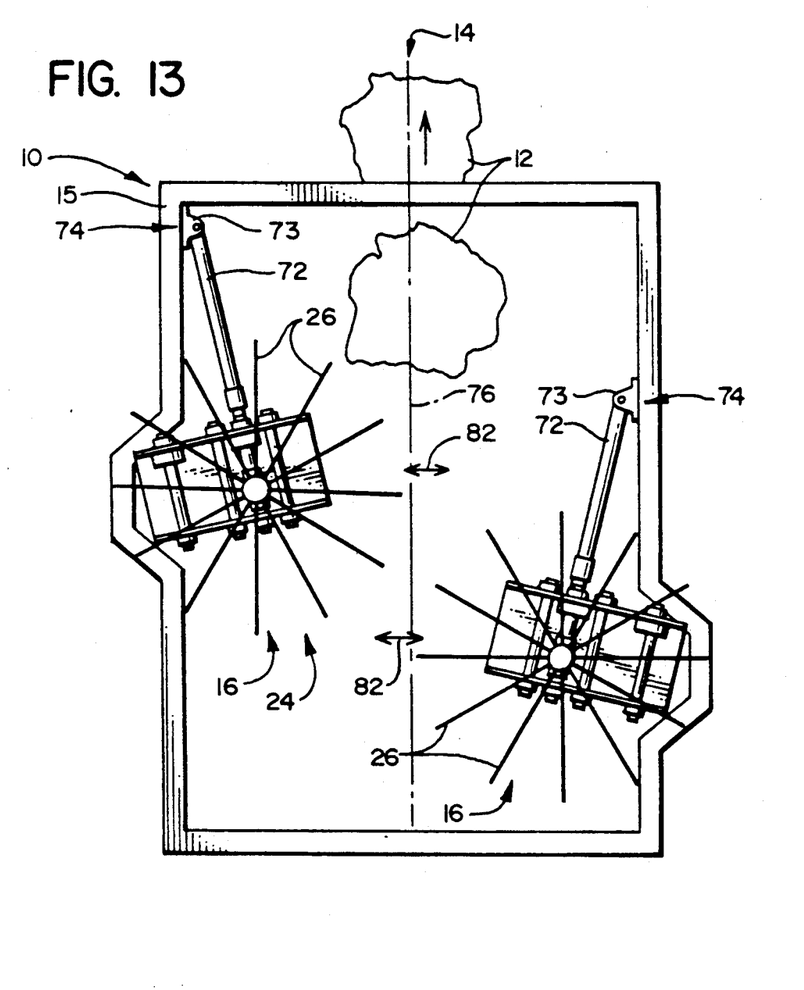
FIG. 13 is a view like FIG. 8 but with the left and right harvesting units offset from one another longitudinally within the enclosure of the harvesting machine.
Figure 21:
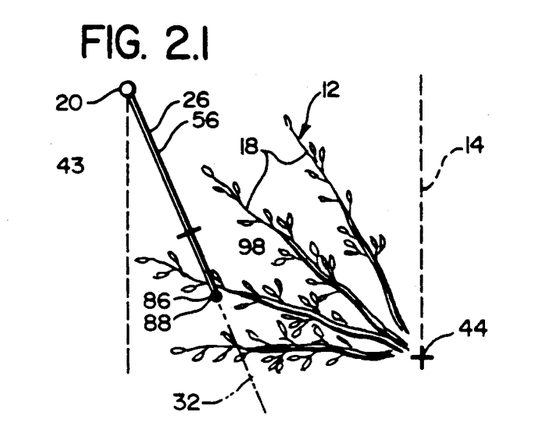
Figure 22:
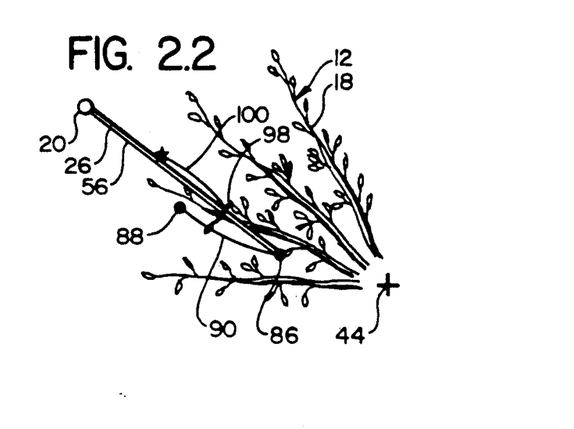
Figure 23:
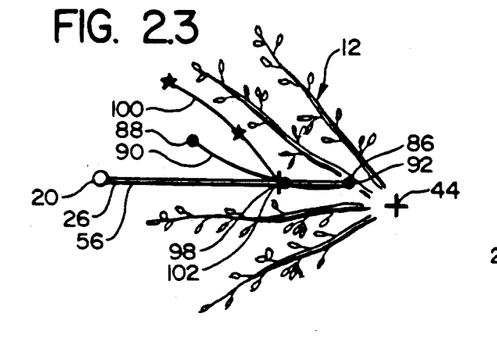
Figure 24:
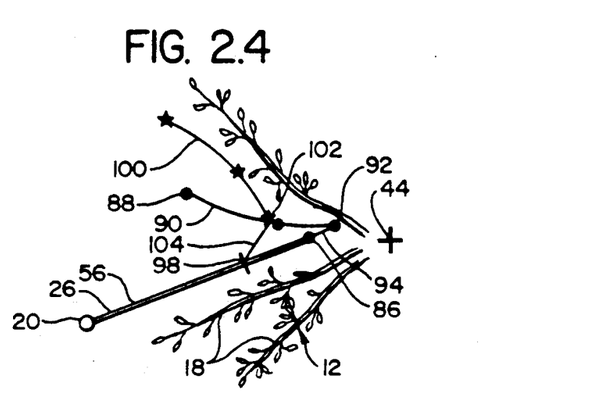
Figure 25:
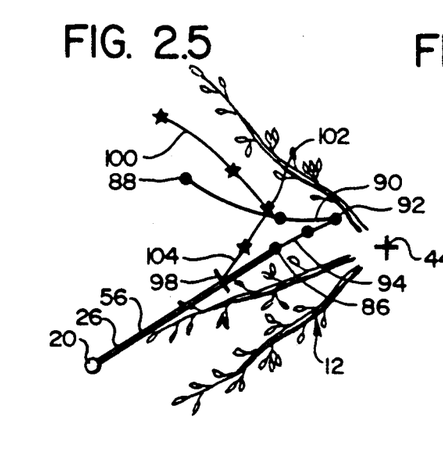
Figure 26:
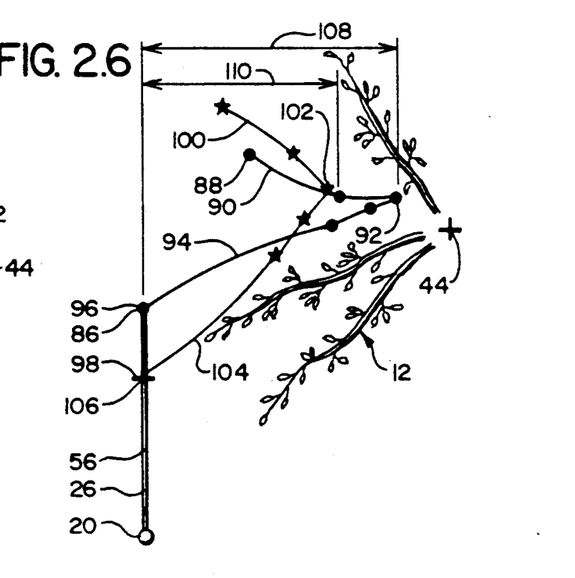
Figure 51:
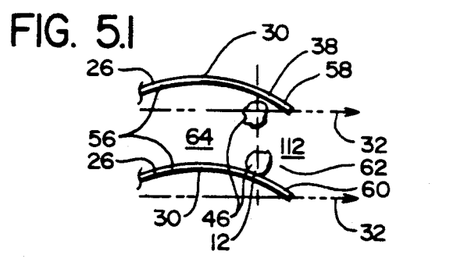
Figure 52:
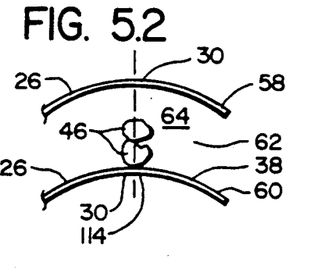
Figure 53:
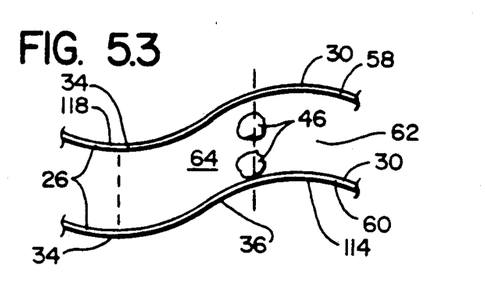
Figure 54:
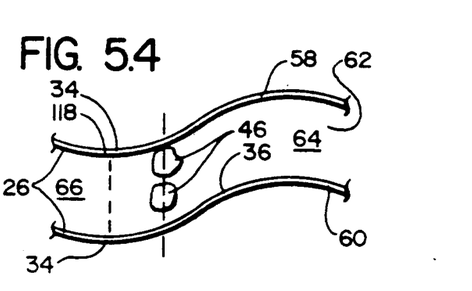
Figure 55:
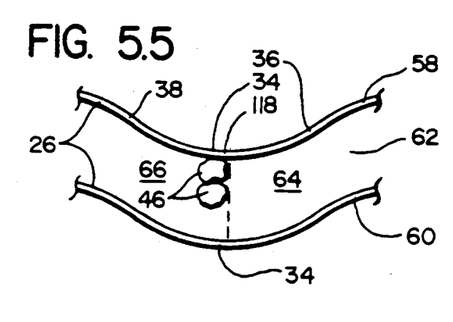
Figure 56:
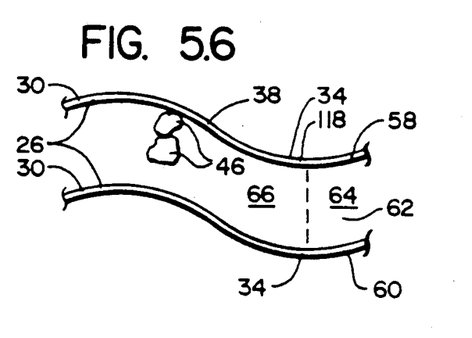

Alternatively as shown in FIG. 13, the left and right harvesting unit 16 may be positioned within the enclosure of the machine 10 in a manner that they offset from one another longitudinally. In this arrangement, the rods 26 of each of the two harvesting assemblies 16 are able to cross over the axis 76 by distances indicated by the double-headed arrows 82.

Having described the basic details of the apparatus, the discussion will now address further details concerning the compound action of the rod assembly 24. As mentioned generally, to raise and depress the crop portions 46, the pairs 56 of the rods 26 rotate while moving laterally in and out of the plants 12 as shown in FIGS. 2.1–2.6. In further detail, the rods 26 start from a forwardly extending position as shown in FIG. 2.1. Then, with the harvesting unit 16 as the frame of reference, the rods rotate (FIGS. 2.1, 2.2, 2.3) along a first path portion rearwardly and laterally into the plant 12 to a laterally extending position shown in FIG. 2.3. Finally, the rods 26 rotate (FIGS. 2.4, 2.5, 2.6) along a second path portion further rearwardly to a rearwardly extending position shown in FIG. 2.6. Now changing the frame of reference to that from the point of view of the plant 12, as shown in FIG. 2.1 an outer endpoint 86 of the rods 26 enters the plant at 88, and then, as shown in FIGS. 2.2 and 2.3, the endpoint 86 moves along a curved entry path, indicated by the heavy curved line 90 connecting the dots, forwardly and laterally into the plant to a maximum insertion location 92 in the plant 12, with this first curved path corresponding to the rods' first path portion. Continuing its motion, this outward endpoint 86 of the rods 26 moves along a curved exit path, indicated by the heavy curved line 94 connecting the dots, forwardly and out from the plant 12 to an exit location at 96 where the rods 26 leave the plant.

Similarly, an intermediate point 98 on the rods 26, which is a few inches radially inward from the outward end 86 of the rods 26 and which is indicated by the short line at 98 which is perpendicular to the rods 26, moves along a two-part curved path, as shown in FIGS. 2.1 through 2.6, first forwardly and into the plant 12 along a curved entry path indicated by the line 100 connecting the stars, to a maximum insertion location at 102 and then forwardly and out from the plant along a curved exit path, indicated by the line 104 connecting the stars, to an exit location 106. As is apparent, the pathline 90, 94 of the endpoint 86 of the rods 26, and the pathline 100, 104 of the intermediate point 98, respectively, have substantial lateral components indicated by the double-headed arrows 108 and 110, respectively, into the plant 12 and out of the plant 12, thereby moving along predominantly lateral curves, as viewed from above, toward and away from the maximum insertion locations.

As described above generally in connection with FIGS. 5.1 through 5.6, the upper rod 58 and the lower rod 60 of each pair 56 cooperate to raise and depress the crop portion 46 (which is indicated by the two circular shapes) imparting the compound motion to the crop portion 46 and spring loading the crop portion 46 upwardly and downwardly. With the crop portion 46 as the frame of reference, let us consider now in detail how the rods 58 and 60, while advancing along their lengthwise axes 32, interact with the crop portion 46.

As shown in FIG. 5.1, initially the crop portion 46 enters an outward opening 112 of the crop receiving area 62 and just touches the rods 58 and 60 without being compressed. Next, as shown in FIG. 5.2, the crop portion 46 rides upwardly upon the downwardly slanted part 38 of the lower rod 60 upwardly onto an upper portion 114 (which is one of the upper portions 30 previously described) of the lower rod 60, where the crop portion 46 is compressed or spring loaded against the lower rod 60. (This spring loading is also schematically represented in FIG. 4, where it is assumed that as the crop portion 46, which is represented by the shaded area 46, is raised and is spring loaded against the lower rod 60, the crop portion 46 will be compressed somewhat and will drop away from the upper rod 58 leaving a first gap area which is designated 116.) Turning back to FIGS. 5.3 and 5.4, as the rods 58 and 60 advance outwardly, the crop portion 46 rides downwardly within the crop receiving area 62, with the compression of the crop portion 46 being eased as the upwardly slanted part 36 of upper portion 114 of the rod 60 advances outwardly and as the surface of the lower rod 60 recedes from the crop portion 46. Then, as shown in FIG. 5.5, the crop portion 46 rides downwardly within the crop receiving area 62 to where a lower portion 118 of the upper rod 58 spring loads it. Finally, as the rods 58 and 60 advance outwardly further as shown in FIG. 5.6, the crop portion 46 rides upwardly along the outwardly downwardly slanted part 38 of the lower portion 118 of the upper rod 58 whereby the compression of the crop portion 46 is eased. When the lateral component of motion (which is indicated by the double-headed arrows 108 and 110 of FIG. 2.6) of the rods 58 and 60 reverses so that the rods 58 and 60 are moving laterally out from the plant 12, then the opposite order of the steps as described will occur. Assuming that, as mentioned before, the rods 58 and 60 each comprise successively at least one of the upper portions 30 and one of the lower portions 34, and that the upper portions 30 of the rods 58 and 60 and the lower portions 34 of the rods 58 and 60, respectively, are vertically aligned, then the crop portion 46 will be fully spring loaded both upwardly and downwardly. Many or few of these slanted parts 36 and 38 and portions 30 and 32 may be combined, thereby providing a correspondingly many or few primary oscillations of the crop portion 46 comprising the primary oscillating motion.

Figure 9:
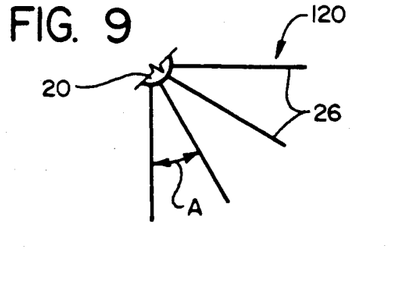
FIG. 9 is a top view of a first arrangement of the wavy-shaped beater rods on the hub, with each radial line in the figure representing a vertical stack of the beater rods.
Figure 12:
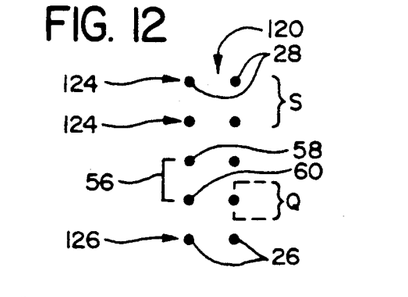
FIG. 12 is a diagram like FIG. 11 except illustrating the first arrangement of the beater rods on the hub.

Added to this primary up and down motion, as mentioned, is the much quicker secondary oscillation of the entire rod assembly 24, resulting in the compound oscillation. Also as mentioned, it is preferable to have the sum of the structural depth Q and the secondary vertical coverage component 2R" match the vertical distance S between the rods 26. A first arrangement 120 of the rod assembly 24, which will be discussed shortly below in connection with technical details and which is shown in FIGS. 9 and 12 uses for the vertical spacing dimension S, 3 inches, for the structural depth Q for the rods 26, 2 inches, and for the secondary vertical component of oscillation 2R'', 1 inch. These dimensions vary for different kinds of plants and for different harvesting conditions. If we assume as shown in FIG. 4 that the crop portions 46 drop away from the upper rod 58 creating the first gap 116 and that the lower rod 60 drops away from the crop portions 46 creating a second gap 122, an actual amplitude R' of the primary motion will be somewhat less than half of the structural depth Q of the rods. Let us further assume that the crop portions 46 are compressed to fifty percent of their original size. The amplitude R' will be abort one fourth of the structural depth Q of the rods. In this case, the amplitude R' of the primary movement will be about one half inch, or approximately equal to an amplitude R'' of the second oscillation which will also be 0.5 inches. However a frequency N' of the primary oscillation, which is about 0.2 hertz to 0.61 hertz is much lower than a frequency N'' of the secondary oscillation, which is about 16 hertz.

It is believed that the spring loading feature of the present invention minimizes sudden, accelerations of the branches 18 of the plants 12. Thus in accordance with this theory, a more vigorous shaking action is able to be achieved.

Having described the basic details of the apparatus and of the compound action, further technical details will now be provided. The rods 26 may be arranged within the rod assembly 24 in a number of ways. For example, let us assume that it is desired to employ relatively small amplitudes (such as R''=0.5 inch). In this case, the first arrangement 120 of the rods 26 may be used, as shown in the top view of FIG. 9 and in the schematic elevation of FIG. 12, with the dots of FIG. 12 indicating the rod attachment locations 28 on the hub 20. The first arrangement 120 comprises a plurality of tiers 124 and, in each tier 124, as shown in FIG. 9, a plurality of the rods 26 are spaced evenly angularly by an angle A, with each of the rods 26 in all the tiers 124, except in a lowest tier 126, being aligned vertically with a related rod 26 in a next lower tier. In this first arrangement 120, the vertically aligned rods 26 in vertically adjacent tiers 124 form the pairs 56 in which one of the rods 26 may be considered as the upper rod 58 and the other, lower, rod 26 may be considered as the lower rod 60.

Figure 10:
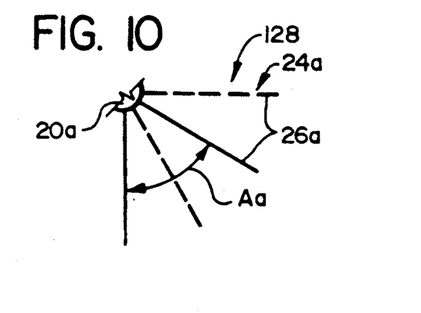
FIG. 10 is a top view of a second arrangement of the wavy-shaped beater rods on the hub wherein the solid radial lines represent the rods of a first tier of the rods, and the dashed radial lines represent the rods of a vertically adjacent lower tier of the rods.
Figure 11:
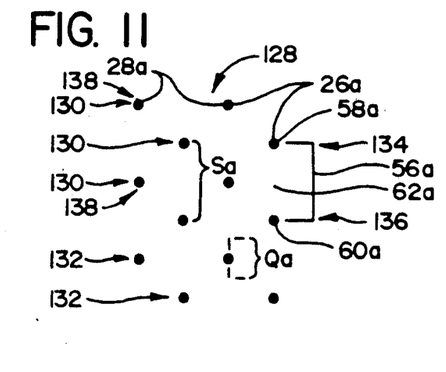
FIG. 11 is a schematic diagram indicating a pattern of attachment points of the beater rods to the upstanding hub in the second arrangements of the beater rods on the hub.

Let us assume instead that it is desired to accommodate the use of relatively large amplitudes R' and R''. In this case, a second arrangement 128 of rods which is shown in FIGS. 10 and 11 may be used, wherein components which are the same as in the first arrangement 120 will be given the same numerical designations with the small letter "a" added. In the second arrangement 128, as in the first arrangement 120, a plurality of the rods 28a radially project from the post 20a, and again these rods 26a are evenly spaced from one another on the post 20. Unlike the first arrangement 120, in which the rods 26 of each tier 124 (except the lowest tier 126) are vertically aligned with the rods 26 in the next lower tier, the second arrangement 128 uses, as shown in FIG. 11 which is another schematic representation of the attachment locations 28a of the rods 26a, an alternating pattern of modified tiers 130. The rods 26a in each of the modified tiers 130 (except the lowest two tiers 132) are vertically aligned only with the rods 26a of the second next lowest tier. In other words, the rods 26a of vertically successive tiers 130 are angularly displaced by one half of the separation angle Aa from their counterpart rods 26a in the tier 130 above. Again, as in the first arrangement 120 the rods 26a form vertical pairs 56a, but in this case the pairs 56a do not comprise rods in vertically adjacent tiers, but rather comprise an upper rod 58a in an upper tier 134 and a lower rod 60a in a second next lower tier 136. The rods 26a of all the tiers 130, except the two lowest tiers 132, may be considered as upper rods 58a in one of the pairs of 56a. (Stated differently, the rods 26a in all the tiers 130 except the two upper most tiers 138 may be considered as lower rods 60a in one of the pairs of 56a.) Again, as in the first arrangement 120, the pairs 56a of rods of the second arrangement 128 comprise the lower rod 60a and the cooperating upper rod 58a which cooperate to raise and depress the crop portions 46 which are located between the rods in the crop receiving area 62a. By alternating the tiers 130 in the described fashion, the second arrangement 128 accommodates relatively large amplitudes Ra' and Ra''. In the second arrangement 128, the sum of the structural depth Qa of the rods 26a, and the secondary oscillation depth 2Ra'' which is caused by the up and down shaking of the rod assembly 24a equals at least a distance Sa by which vertically each tier 130 is spaced from its next to adjacent tier. In practice, Qa=4 inches, 2Ra''=2 inches, and Sa=6 inches. These dimensions vary for varying types of plants and conditions.

In both arrangements 120 and 128, the number of total tiers of rods attached to the post 20, 20a, will depend upon the height of the plants 12. For example, for plants 6 to 7 feet high, 20 to 25 tiers may be used, and for plants over 7 feet more than 25 tiers may be used. In the first arrangement 120 there are twelve rods or spokes 26 to each tier 124, while in the second arrangement 128, there are half as many rods 26a to each of the tiers 130 as in the first arrangement 120. Other rod arrangements which use the pairs 56 of rods are possible and would be within the scope of the present invention.

Concerning the shape of the slanted parts 36 and 38 of the rods 26, FIG. 7 shows that as viewed from the side, the slanted parts 36 and 38 make a relatively shallow included angle alpha (which in practice is about 25 to 30 degrees) with the lengthwise axis 32 of the rod 26. For smooth lateral movement of the rods 26, along lengthwise axes 32 through the plant 12, the succession of upwardly and downwardly slanted parts 36 and 38 makes an S-shaped curve.

It is to be noted as shown in FIG. 7 that each rod 26 transmits some useful shaking energy to the plants 12 indirectly by means of mechanical waves which the rod 26 propagates through the elements of the plant 12. The rods 26 shaped in accordance with the present invention send off waves of mechanical energy in an angular range beta of directions, varying in practice through a range as, for example, about 60°.

It is to be noted that, as shown in FIG. 1, for providing the up and down secondary shaking motion to the post 20 and the rod assembly 24, the secondary oscillating means 52 uses an oscillating linkage 150. The linkage 150 comprises a rotating crank means 152 connected to a connecting rod 154, with the connecting rod 154 connecting via an upper post anchor 156 to a journal bearing 158, in which, for freely rotatable mounting of the post 20, a pin 160, which is fixed to the upper end of the post 20, is journalled. Also, for free rotation and up and down shaking of the post 20, the lower end of the post 20 is fixed to a pin 162 which is journalled in a lower journal bearing 164 which is supported so that it is positioned directly below the upper journal bearing 158. The post 20 is substantially hollow, comprising a relatively long cylinder sheath 166 which is closed at its upper and lower ends by upper and lower end caps 168 with the end caps being held to the cylinder sheath by means of vertically extending tension wires or rods 170. When, as earlier described in connection with the basic details of the harvester units 16, the right and left swinging frames 72 are used to mount the right and left harvesting units 16, it is practical to mount each harvesting unit 16, including the oscillating means 52, on an upper swinging arm means 172 which supports the rotatable crank means 152 of the oscillating linkage 150 and on a lower swinging arm 174 which supports the lower journal bearing 164.

It is to be understood that various modifications could be made to the present invention without departing from the basic teachings thereof.

What is claimed is:

1. An apparatus for harvesting produce from a row of crops, said apparatus comprising:
   a. a chassis adapted to travel along said row;
   b. a vertically aligned hub means which is carried by said chassis and which is positioned to be adjacent to said row as said chassis travels along said row;
   c. a beater rod assembly comprising a plurality of substantially horizontally arranged beater rod means which are attached to said hub means at vertically spaced locations and which extend radially outwardly from said hub means, with each of said beater rod means having a lengthwise axis and at least an upwardly slanted portion which slants radially outwardly and upwardly and a downwardly slanted portion which is spaced from said upwardly slanted portion along said lengthwise axis and which slants radially outwardly and downwardly to form upper and lower portions of said rod means, with said hub means being mounted about a vertical axis in a manner that as said chassis moves along said row each of said rod means moves in a rotational path about the vertical axis, the rotational path having at least a first path portion where each of the rod means rotates from a forwardly extending position rearwardly and laterally into said row to a laterally extending position, and a second path portion where the rod means rotates from said laterally extending position further rearwardly to a rearwardly extending position, with said upper and lower portions of said rod means having lateral components of motion into and out of said row of plants as said rod means moves on said rotational path so that various crop portions of said plants are raised and depressed as each of said crop portions are engaged successively by said upper and lower portions of the rod means;
   d. a secondary oscillating means operatively connected to said rod assembly to move said rod assembly upwardly and downwardly to impart secondary up and down components of movement to each of said crop portions as said crop portions are raised and depressed;
   e. said apparatus being characterized in that a pair of upper and lower related rod means are in vertical alignment and in that said upper and lower portions, respectively, of said upper rod means are vertically aligned with said upper and lower portions, respectively, of said lower rod means, so that said upper and lower rod means cooperate in said raising and depressing of said crop portions.

2. The apparatus as recited in claim 1, wherein a structural depth of said beater rod means, which is a vertical distance from an upper side of said upper portion of said beater rod means to a lower side of said lower portion, is greater than three times an amplitude of said secondary up and down components of movement which are imparted by said secondary oscillating means.

3. The apparatus as recited in claim 2, wherein:
   a. a sum of said structural depth of said beater rod means plus twice said amplitude of said secondary up and down components of motion equals at least a vertical spacing distance by which said beater rod means are vertically spaced from one another in said rod assembly
   b. said beater rod means has at least one of said upper portions and one of said lower portions which is spaced along said lengthwise axis from said upper portion, with said upper portion comprising one of said upwardly slanted portions and one of said downwardly slanted portions and with said lower portion comprising one of said downwardly slanted portions and one of said upwardly slanted portions.

4. The apparatus as recited in claim 3, wherein said structural depth of said beater rod means is at least four times said amplitude of said secondary up and down components of motion.

5. The apparatus as recited in claim 2, wherein a sum of said structural depth of said beater rod means plus twice said amplitude of said secondary up and down components of motion equals at least a vertical spacing distance by which said beater rod means are vertically spaced from one another in said rod assembly.

6. The apparatus as recited in claim 5, wherein said beater rod means ends outwardly with one of said downwardly slanted portions.

7. The apparatus as recited in claim 2, wherein said structural depth of said beater rod means is at least four times said amplitude of said secondary up and down components of motion.

8. The apparatus as recited in claim 7, wherein:
   a. said beater rod means has at least one of said upper portions and one of said lower portions which is spaced along said lengthwise axis from said upper portion, with said upper portion comprising one of said upwardly slanted portions and one of said downwardly slanted portions and with said lower portion comprising one of said downwardly slanted portions and one of said upwardly slanted portions;
   b. said upper portions and said lower portions are spaced along said lengthwise axis of said beater rod means by an axial distance which is 0.5 to 5 times a travel distance which said chassis travels in one second.

9. The apparatus as recited in claim 2, wherein upper and lower beater rod means, respectively, which are in vertical alignment, are arranged on said hub means in, respectively, an upper tier of said beater rod means and a vertically adjacent lower tier of said beater rod means, where each tier contains a plurality of said beater rod means.

10. The apparatus as recited in claim 1, wherein said upper and lower rod means, respectively, which are in vertical alignment, are in, respectively, an upper tier of said beater rod means and a lower tier of said beater rod means, with said upper and lower tiers being separated by a middle tier of said beater rod means, and with said rod means of said middle tier being positioned in a manner that said rod means of said middle tier are angularly displaced from vertical alignment positions, which are positions which are vertically aligned with said rod means of said upper tier, by an angular displacement which is half of an angular displacement between said vertical alignment positions.

11. The apparatus as recited in claim 10, wherein:
a. a structural depth of said beater rod means, which is a vertical distance from an upper side of said upper portion of said beater rod means to a lower side of said lower portion, is greater than three times an amplitude of said secondary up and down components of movement which are imparted by said secondary oscillating means;
b. a sum of said structural depth of said beater rod means plus twice said amplitude of said secondary up and down components of motion equals at least a vertical spacing distance by which said beater rod means in said upper tier and in said lower tier are vertically spaced from one another in said rod assembly;
c. said beater rod means has at least one of said upper portions and one of said lower portions which is spaced along said lengthwise axis from said upper portion, with said upper portion comprising one of said upwardly slanted portions and one of said downwardly slanted portions and with said lower portion comprising one of said downwardly slanted portions and one of said upwardly slanted portions.

12. A pair of beater rod means for use in an apparatus for harvesting produce from a row of crops, said pair of beater rod means extending from a substantially vertically aligned hub means which is carried by a chassis, said beater rod means comprising an upper beater rod means and a lower beater rod means, with each of said beater rod means having a lengthwise axis and at least an upwardly slanted portion, which slants radially outwardly and upwardly with respect to said axis, and a downwardly slanted portion at an end of said beater rod means distal from said hub means, which downwardly slanted portion is spaced from said upwardly slanted portion along said axis and which slants radially outwardly and downwardly with respect to said axis, to form upward and lower portions of said beater rod means, with said beater rod means being adapted to be mounted at vertically spaced locations upon said hub means and to extend radially outwardly from said hub means and to be in vertical alignment with one another so that said upper and lower portions, respectively, of said upper beater rod portions, respectively, of said lower beater rod means to form a crop receiving area between said upper and lower beater rod means, with said pair of beater rod means, along with other beater rod means and said hub means, making a harvesting unit which is positioned adjacent to said row as said chassis travels along said row.

13. The pair of beater rod means as recited in claim 12, wherein said beater rod means has at least one of said upper portions and one of said lower portions which is spaced along said lengthwise axis from said upper portion, with said upper portion comprising one of said upwardly slanted portions and one of said downwardly slanted portions and with said lower portion comprising one of said downwardly slanted portion and one of said upwardly slanting portions.

14. The pair of beater rod means as recited in claim 13, wherein said upper portions and said lower portions are spaced along said lengthwise axis of said beater rod means by an axial distance which is 0.5 to 5 times a travel distance which said chassis travels in one second.

15. A method for harvesting produce from upstanding plants, comprising:
a. providing a harvesting unit comprising:
  i. a hub means which is rotatable about a vertical axis;
  ii. a rod assembly comprising a plurality of substantially horizontally arranged beater rod means, which are attached to said hub means at vertically spaced locations and which extend radially outwardly from said hub means, with each of said beater rod means having a lengthwise axis and at least an upwardly slanted portion which slants radially outwardly and upwardly and a downwardly slanted portion which is spaced from said upwardly slanted portion along said lengthwise axis and which slants radially outwardly and downwardly to form upper and lower portions of said beater rod means;
b. moving said harvesting unit along a row of said plants in a manner that each of said rod means moves on a rotational path about said vertical axis, said rotational path having a first path portions where each of the rod means rotates from a forwardly extending position rearwardly and laterally into the row to a laterally extending position, and a second path portion where the rod means rotates from said laterally extending position further rearwardly top a rearwardly extending position, with said upper and lower portions of said rod means having lateral components of motion into and out of said row of plants as said rod means moves on said rotational path, so that various crop portions of said plants are raised and depressed as each of said crop portions are engaged successively by said upper and lower portions of said rod means;
c. moving said rod assembly up and down to impart secondary up and down components of movement to each of said crop portions as said crop portions as raised and lowered.

16. The method as recited in claim 15, wherein:
a. said method is characterized in that a set of upper and lower related rod means are in vertical alignment, and in that said upper and lower portions, respectively, of said upper rod means are vertically aligned with said upper and lower portions, respectively, of said lower related rod means, so that said upper and lower related rod means cooperate in said raising and depressing of said crop portions;
b. said upper and lower rod means define a crop receiving area which is adapted to receive said crop portions in a manner that, as said upper and lower rod means move laterally into and out of said row during said rotational-lateral movement of said rod means, said crop portions ride upwardly upon said downwardly slanted portions of said lower rod means whereby said crop portions are raised and said corp portions ride downwardly upon said upwardly slanted portions of said upper rod means whereby said crop portions are depressed.

17. The method as recited in claim 11, wherein said beater rod means spring load said crop portions, with said spring loading having vertical spring loading components which spring load said crop portion upwardly and downwardly during said upward and downward movement of said beater rod means.

18. The method as recited in claim 17, wherein said beater rod means has at least one of said upper portions and one of said lower portions which is spaced along said lengthwise axis from said upper portion, with said upper portion comprising one of said upwardly slanted portions and one of said downwardly slanted portions and with said lower portion comprising one of said downwardly slanted portion and one of said upwardly slanting portions.

19. The method as recited in claim 18, wherein:
   a. an amplitude of said raising and depressing of said crop portions (discounting said secondary up and down components of motion of said rod assembly) is 0.5 to 4 times an amplitude of said secondary up and down components of motion of said rod assembly;
   b. a frequency of said secondary up and down components of motion of said rod assembly is twenty to eighty times a frequency of said raising and depressing of said crop portions discounting said secondary up and down components of motion of said rod assembly.

20. A method for harvesting produce from upstanding plants, comprising:
   a. providing a harvesting unit comprising:
      i. a hub means which is rotatable about a vertical axis;
      ii. a rod assembly comprising a plurality of beater rod means, which are attached to said hub means at vertically spaced locations and which extend radially outwardly from said hub means, each of said beater rod means having a lengthwise axis and at least an upwardly slanted portion which slants radially outwardly and upwardly and a downwardly slanted portion which is spaced from said upwardly slanted portion along said lengthwise axis and which slants radially outwardly and downwardly;
   b. moving said harvesting unit along a row of said plants in a manner that each of said rod means moves on a rotational path having a first path portion where each of said rod means rotates from a forwardly extending position rearwardly and laterally into said row to a laterally extending position, and a second path portion where said rod means rotates from said laterally extending position further rearwardly to a rearwardly extending position;
   c. moving each of said beater rod means up and down to impart secondary up and down components of movement to various crop portions of said plants;
   d. said method being characterized in that a combination of an amplitude of said secondary up and down components of movement, and a structural depth, which is a vertical distance between an upper side of upper portions of said beater rod means and a lower side of lower portions of said beater rod means, enables said rod means to cover an entire vertical spacing dimension which is a distance by which said rod means in said rod assembly are vertically spaced from one another.

21. The method as recited in claim 20, wherein said combination of said upwardly slanted portion and said downwardly slated portion facilitates touching of said rod means with individual branches of said plants at multiple locations on said branches.

22. The method as recited in claim 21, wherein said rod means ends outwardly with one of said downwardly slanted portions.

23. An apparatus for harvesting produce from a row of crops, said apparatus comprising:
   a. a chassis adapted to travel along the row;
   b. a harvesting unit which is carried by the chassis comprising:
      i. upper engaging means for engaging an upper side of a given portion of the crops,
      ii. lower engaging means for engaging a lower side of the given portion,
      iii. first oscillating means for driving the upper and lower engaging means to depress and raise respectively, the given portion to cause the given portion to oscillate with a first component of oscillation; and
      iv. second oscillating means for driving the upper and lower engaging means to depress and raise, respectively, the given portion to cause the given portion to oscillate with a second component of oscillation, where the second component is divided into an upper zone, a central zone, and a lower zone;
   c. whereby the combined depressing and raising of the given portion causes:
      i. the given portion to oscillate vertically such that the central zone is entirely above a horizontal plane at a point in time while the lower engaging means engages the given portion, and
      ii. the given portion to oscillate such that the central zone is entirely below the horizontal plane at a point in time while the upper engaging means engages the given portion.

24. A method for harvesting produce from upstanding plants, comprising the steps of:
   a. engaging an upper side and a lower side of a given portion of the plants;
   b. imparting to the given portion first and second components of vertical oscillation, where the second component is divided into an upper zone, a central zone, and a lower zone;
   c. whereby
      i. the given portion oscillates such that the central zone is entirely above a horizontal plane at a point in time while the lower side of the given portion is engaged; and
      ii. the given portion oscillates such that the central zone is entirely below the horizontal plane at a point in time while the upper side of the given portion is engaged.

* * * * *